United States Patent
Oreyang

(10) Patent No.: US 9,250,627 B2
(45) Date of Patent: Feb. 2, 2016

(54) FORWARD AND LATERAL TRACKING SYSTEM AND CONTROL METHOD THEREOF

(71) Applicant: Acrox Technologies Co., Ltd., Taipei (TW)

(72) Inventor: Yia-Yuan Oreyang, Taipei (TW)

(73) Assignee: Acrox Technologies Co., Ltd., Taipei (TW)

( * ) Notice: Subject to any disclaimer, the term of this patent is extended or adjusted under 35 U.S.C. 154(b) by 0 days.

(21) Appl. No.: 14/288,402

(22) Filed: May 28, 2014

(65) Prior Publication Data

US 2015/0346719 A1   Dec. 3, 2015

(51) Int. Cl.

| | |
|---|---|
| G05D 1/00 | (2006.01) |
| G01S 15/00 | (2006.01) |
| G01S 15/04 | (2006.01) |
| G06Q 10/00 | (2012.01) |
| G01C 22/00 | (2006.01) |
| B62D 51/04 | (2006.01) |

(52) U.S. Cl.
CPC .............. G05D 1/0011 (2013.01); B62D 51/04 (2013.01); G01C 22/00 (2013.01); G01S 15/04 (2013.01); G06Q 10/00 (2013.01)

(58) Field of Classification Search
CPC ........ G01C 22/00; G06Q 10/00; G01S 15/04; G01D 1/0011
USPC .................... 701/2, 23; 705/2; 180/19.1, 19.3
See application file for complete search history.

(56) References Cited

U.S. PATENT DOCUMENTS

| 8,046,160 | B2 * | 10/2011 | Carter et al. ................... 701/498 |
| 8,634,981 | B1 * | 1/2014 | Hyde et al. ....................... 701/23 |
| 2006/0237239 | A1 * | 10/2006 | Bruner et al. ................... 180/6.7 |
| 2012/0182392 | A1 * | 7/2012 | Kearns et al. ................... 348/46 |
| 2014/0196967 | A1 * | 7/2014 | Chang et al. ................... 180/167 |
| 2014/0262593 | A1 * | 9/2014 | Castaneda et al. ............ 180/446 |

* cited by examiner

*Primary Examiner* — Fadey Jabr
*Assistant Examiner* — Yazan A Soofi
(74) *Attorney, Agent, or Firm* — Leong C. Lei

(57) ABSTRACT

The forward and lateral tracking system contains a moving carrier and a remote control device. The moving carrier contains a front frame, a first lateral frame, a second lateral frame, and at least a driving unit. The front frame has a first IR (infra-red) receiver and a second IR receiver for detecting left and right movement, and a first supersonic detector for detecting forward distance. The first lateral frame has a second supersonic detector and a third supersonic detector for detecting left and right movement, and a third IR receiver. The second lateral frame has a fourth supersonic detector and a fifth supersonic detector for detecting left and right movement, and a fourth IR receiver. The remote control device contains at least an IR transmitter signally linked to the IR receivers.

10 Claims, 11 Drawing Sheets

FORWARD AND LATERAL TRACKING SYSTEM AND CONTROL METHOD THEREOF

BACKGROUND OF INVENTION (a) Technical Field of the Invention

The present invention is generally related to automatic control systems, and more particular to a forward and lateral tracking system and a related method where a moving carrier follows a user at a constant distance behind as the user moves or turns.

(b) Description of the Prior Art

Automatic carriers that can follow people to move around have already been developed. These automatic carriers usually employ a supersonic detector to detect distance so as to maintain a constant distance as the carriers follow the users. For these automatic carriers, the users usually can only move straight ahead. If the users turn left or right, the automatic carriers usually cannot respond in time and as such fail to follow up.

SUMMARY OF THE INVENTION

To obviate the above-described shortcoming, the present invention teaches a novel forward and lateral tracking system, which contains a moving carrier and a remote control device. The moving carrier contains a control module, a front frame, a first lateral frame, a second lateral frame, and at least a driving unit. The driving unit is configured in the moving carrier and electrically connected with the control module. The control module directs the driving unit to move or turn the moving carrier. The front frame is configured on the moving carrier, and has a first IR (infra-red) receiver and a second IR receiver for detecting left and right movement, and a first supersonic detector for detecting forward distance. The first lateral frame is configured on the moving carrier, and has a second supersonic detector and a third supersonic detector for detecting left and right movement, and a third IR receiver. The second lateral frame is configured on the moving carrier, and has a fourth supersonic detector and a fifth supersonic detector for detecting left and right movement, and a fourth IR receiver. The remote control device contains at least an IR transmitter signally linked to the first, second, third, and fourth IR receivers. When a user is straight ahead of the moving carrier, the IR receivers and the supersonic detector provide lateral movement and forward distance detection, so that the moving carrier automatically follows the user at a constant distance behind as the user moves straight ahead, or turns left or right. When the user is at the moving carrier's left or right side, the IR receivers and the supersonic detectors on the first and second lateral frames provide lateral distance and lateral movement detection, so that the moving carrier automatically follows the user at a constant distance behind as the user moves straight, or turns left or light, away from the first or second lateral frame.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become apparent to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
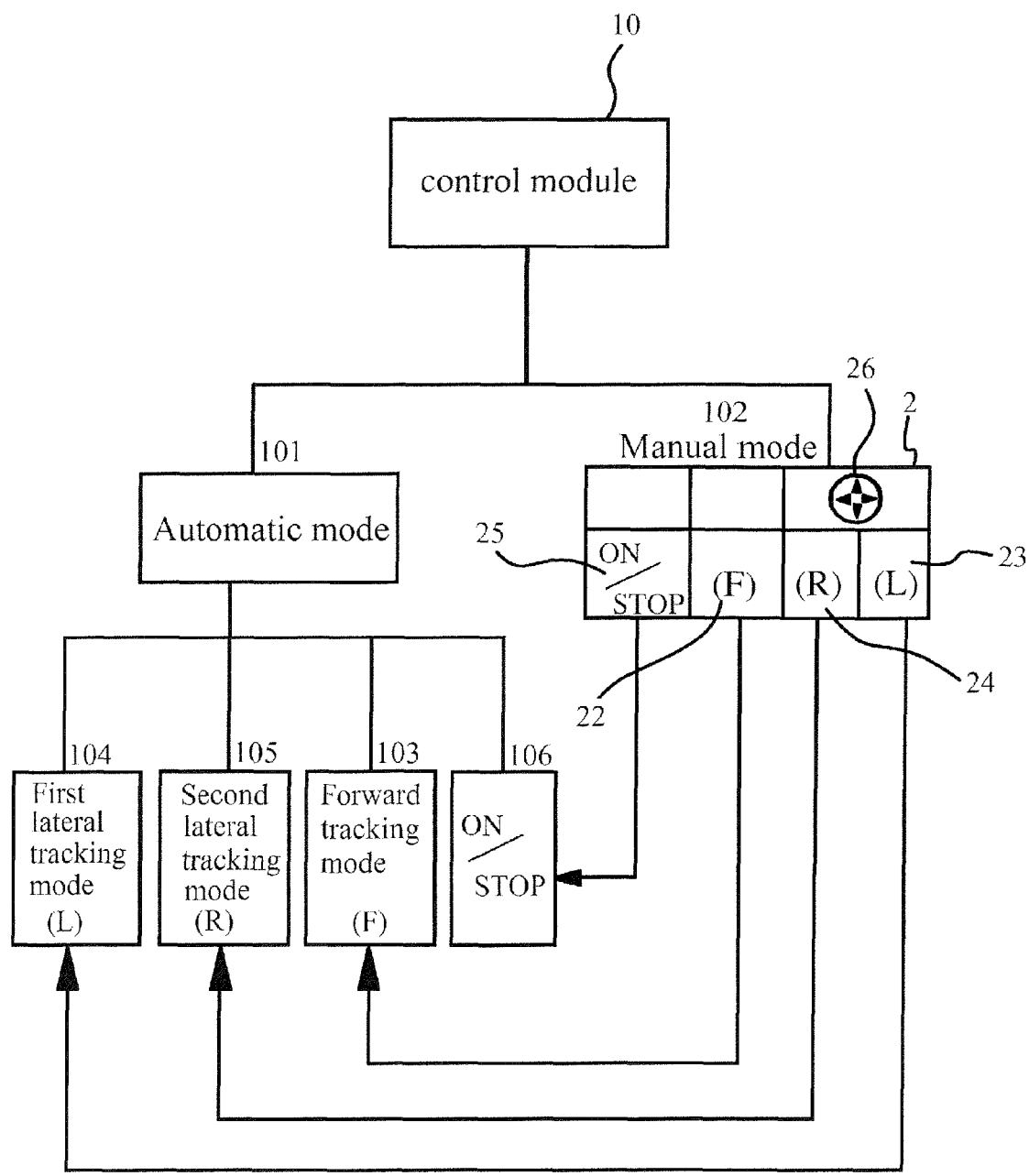
FIG. 1 is a schematic diagram showing a control logic of a forward and lateral tracking system according to an embodiment of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1 to 10, a forward and lateral tracking system according to an embodiment of the present invention contains a moving carrier 1 and a remote control device 2.

The moving carrier 1 contains a control module 10, a front frame 11, a first lateral frame 12, a second lateral frame 13, and at least a driving unit 14.

The control module 10 is configured inside the moving carrier 1. The control module 10 operates in an automatic mode 101 or in a manual mode 102 controlled by the remote control device 2. The automatic mode 101 can be further configured to be a forward tracking mode 103, a first lateral tracking mode 104, a second lateral tracking mode 105, or an ON/STOP mode 106 to toggle between an ON or STOP state of the moving carrier 1.

The front frame 11 is configured on the moving carrier 1. A first 1K (infra-red) receiver 111 is configured adjacent to a first lateral side of the front frame 11, and a second IR receiver 112 is configured adjacent to a second lateral side of the front frame 11. A first supersonic detector 113 is configured between the first and second IR receivers 111 and 112. The first and second IR receivers 111 and 112, and the first supersonic detector 113 are electrically connected with the control module 10 which receives feedback signals from the first and second IR receivers 111 and 112, and the first supersonic detector 113, processes the feedback signals, and produces a control signal to the driving unit 14.

The first lateral frame 12 is configured on the moving carrier 1 and has a front end joined to a first lateral end of the front frame 11. A second supersonic detector 121 is configured adjacent to the front end of the first lateral frame 12, and a third supersonic detector 122 is configured adjacent to a back end of the first lateral frame 12. A third IR receiver 123 is configured between the second and third supersonic detector 121 and 122. The second and third supersonic detectors 121 and 122, and the third IR receiver 123 are electrically connected with the control module 10 which receives feedback signals from the second and third supersonic detectors 121 and 122, and the third IR receiver 123, processes the feedback signals, and produces a control signal to the driving unit 14.

The second lateral frame 13 is configured on the moving carrier 1 and has a front end joined to a second lateral end of the front frame 11. A fourth supersonic detector 131 is configured adjacent to the front end of the second lateral frame 13, and a fifth supersonic detector 132 is configured adjacent to a back end of the second lateral frame 13. A fourth IR receiver 133 is configured between the fourth and fifth supersonic detector 131 and 132. The fourth and fifth supersonic detectors 131 and 132, and the fourth IR receiver 133 are electrically connected with the control module 10 which receives feedback signals from the fourth and fifth supersonic detectors 131 and 132, and the fourth IR receiver 133, processes the feedback signals, and produces a control signal to the driving unit 14.

The driving unit 14 is configured in the moving carrier 1 and electrically connected with the control module 10. The control signal produced by the control module 10 directs the driving unit 14 to move the moving carrier 1 forward, to turn left, or to turn right. The driving unit 14 drives the moving carrier's wheels or tracks. The moving carrier 1 further contains at least a battery module providing the required electricity to the driving unit 14 and the control module 10.

The remote control device 2 contains at least an IR transmitter 21. The remote control device 2 and the control module 10 are configured with an identification code. After an authentication process based on the identification code between the remote control device 2 and the control module 10 is successfully finished, the IR transmitter 21 of the remote control device 2 is linked to the first to the fourth IR receivers 111, 112, 123, and 133. The remote control device 2 further contains at least a forward tracking button 22, a first lateral tracking button 23, a second lateral tracking button 24, a toggle button 25, and a number of direction control buttons 26.

The present invention also provides a control method for the forward and lateral tracking system, which contains the following steps.

In step 100, the control module 10 is set to operate in the automatic mode 101 or in the manual mode 102 controlled by the remote control device 2.

In step 110, if the automatic mode 101 is set, the control module 10 is further set to operate in the forward tracking mode 103, the first lateral tracking mode 104, the second lateral tracking mode 105, or the ON/STOP mode.

In step 120, if the forward tracking mode 103 is set, the first and second IR receivers 111 and 112, and the first supersonic detector 113 on the front frame 11 of the moving carrier 1 are all activated. However, the second and third supersonic detectors 121 and 122, and the third IR receiver 123 on the first lateral frame 12 are turned off. The fourth and fifth supersonic detectors 131 and 132, and the fourth IR receiver 133 on the second lateral frame 13 are also turned off. For a user straight ahead the moving carrier 1, the first and second IR receivers 111 and 112 detect the user's left and right moving directions whereas the first supersonic detector 113 detects a forward distance between the user and the moving carrier 1. As such, the control module 10 is able to automatically control the moving carrier 1 to follow the user at a constant distance (e.g., 2 to 3 meters) behind.

In step 130, if the first lateral tracking mode 104 is set, the first supersonic detector 113 on the front frame 11, the second and third supersonic detectors 121 and 122, and the third IR receiver 123 on the first lateral frame 12 are all activated. The fourth and fifth supersonic detectors 131 and 132, and the fourth IR receiver 133 on the second lateral frame 13 are turned off. For a user at the first lateral side of the moving carrier 1 and moving away from the first lateral frame 12, the second and third supersonic detectors 121 and 122, based on the triangulation method, detect the user's left and right moving directions and a distance between the user and the moving carrier 1. As such, the control module 10 is able to automatically control the moving carrier 1 to follow the user at a constant distance (e.g., 1 to 2 meters) behind.

In step 140, if the second lateral tracking mode 105 is set, the first supersonic detector 113 on the front frame 11, the fourth and fifth supersonic detectors 131 and 132, and the third IR receiver 133 on the second lateral frame 13 are all activated. The second and third supersonic detectors 121 and 122, and the third IR receiver 123 on the first lateral frame 12 are turned off. For a user at the second lateral side of the moving carrier 1 and moving away from the second lateral frame 13, the fourth and fifth supersonic detectors 131 and 132, based on the triangulation method, detect the user's left and right moving directions and a distance between the user and the moving carrier 1. As such, the control module 10 is able to automatically control the moving carrier 1 to follow the user at a constant distance (e.g., 1 to 2 meters) behind.

In step 150, if the control module 10 is set to the ON/STOP mode to toggle between the ON or STOP state of the moving carrier 1, the moving carrier 1 is set to the ON (i.e., activated) state if it is currently in the STOP (i.e., deactivated) state, or the moving carrier 1 is set to the STOP state if it is currently in the ON state.

In step 160, if the manual mode 102 is set, the remote control device 2 is used to manually control the moving carrier 1 using the forward tracking button 22, first lateral tracking button 23, second lateral tracking button 24, toggle button 25, and direction control buttons 26.

In step 170, if the forward tracking button 22 is activated, the first and second IR receivers 111 and 112, and the first supersonic detector 113 on the front frame 11 of the moving carrier 1 are all activated. However, the second and third supersonic detectors 121 and 122, and the third IR receiver 123 on the first lateral frame 12 are turned off. The fourth and fifth supersonic detectors 131 and 132, and the fourth IR receiver 133 on the second lateral frame 13 are also turned off. For a user straight ahead the moving carrier 1, the first and second IR receivers 111 and 112 detect the user's left and right moving directions whereas the first supersonic detector 113 detects a forward distance between the user and the moving carrier 1. As such, the control module 10 is able to automatically control the moving carrier 1 to follow the user at a constant distance (e.g., 2 to 3 meters) behind.

In step 180, if the first lateral button 23 is activated, the first supersonic detector 113 on the front frame 11, the second and third supersonic detectors 121 and 122, and the third IR receiver 123 on the first lateral frame 12 are all activated. The fourth and fifth supersonic detectors 131 and 132, and the fourth IR receiver 133 on the second lateral frame 13 are turned off. For a user at the first lateral side of the moving carrier 1 and moving away from the first lateral frame 12, the second and third supersonic detectors 121 and 122, based on the triangulation method, detect the user's left and right moving directions and a distance between the user and the moving carrier 1. As such, the control module 10 is able to automatically control the moving carrier 1 to follow the user at a constant distance (e.g., 1 to 2 meters) behind.

In step 190, if the second lateral button 24 is activated, the first supersonic detector 113 on the front frame 11, the fourth and fifth supersonic detectors 131 and 132, and the third IR receiver 133 on the second lateral frame 13 are all activated. The second and third supersonic detectors 121 and 122, and the third IR receiver 123 on the first lateral frame 12 are turned off. For a user at the second lateral side of the moving carrier 1 and moving away from the second lateral frame 13, the fourth and fifth supersonic detectors 131 and 132, based on the triangulation method, detect the user's left and right moving directions and a distance between the user and the moving carrier 1. As such, the control module 10 is able to automatically control the moving carrier 1 to follow the user at a constant distance (e.g., 1 to 2 meters) behind.

In step 200, if the toggle button 25 is activated, the moving carrier 1 is set to the ON (i.e., activated) state if it is currently in the STOP (i.e., deactivated) state, or the moving carrier 1 is set to the STOP state if it is currently in the ON state.

In step 210, if any one of the direction buttons 26 is activated, the moving carrier 1 is manually controlled by the user through the remote control device 2 to move in the direction specified by the activated direction control button 26.

Figure 2:
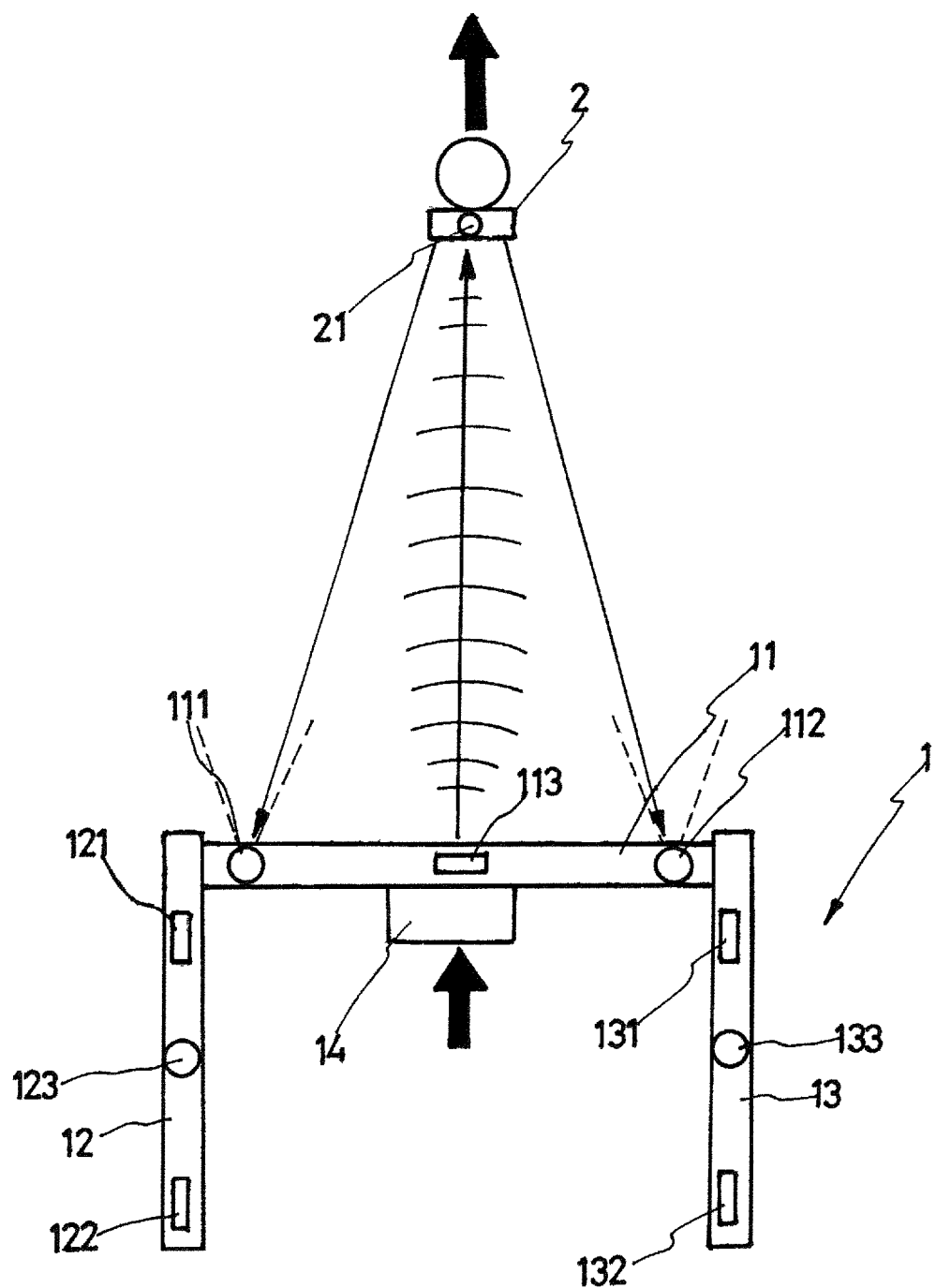
FIG. 2 is a schematic diagram showing a moving carrier of the forward and lateral tracking system of FIG. 1 follows a user as the user moves straight forward.
Figure 3:
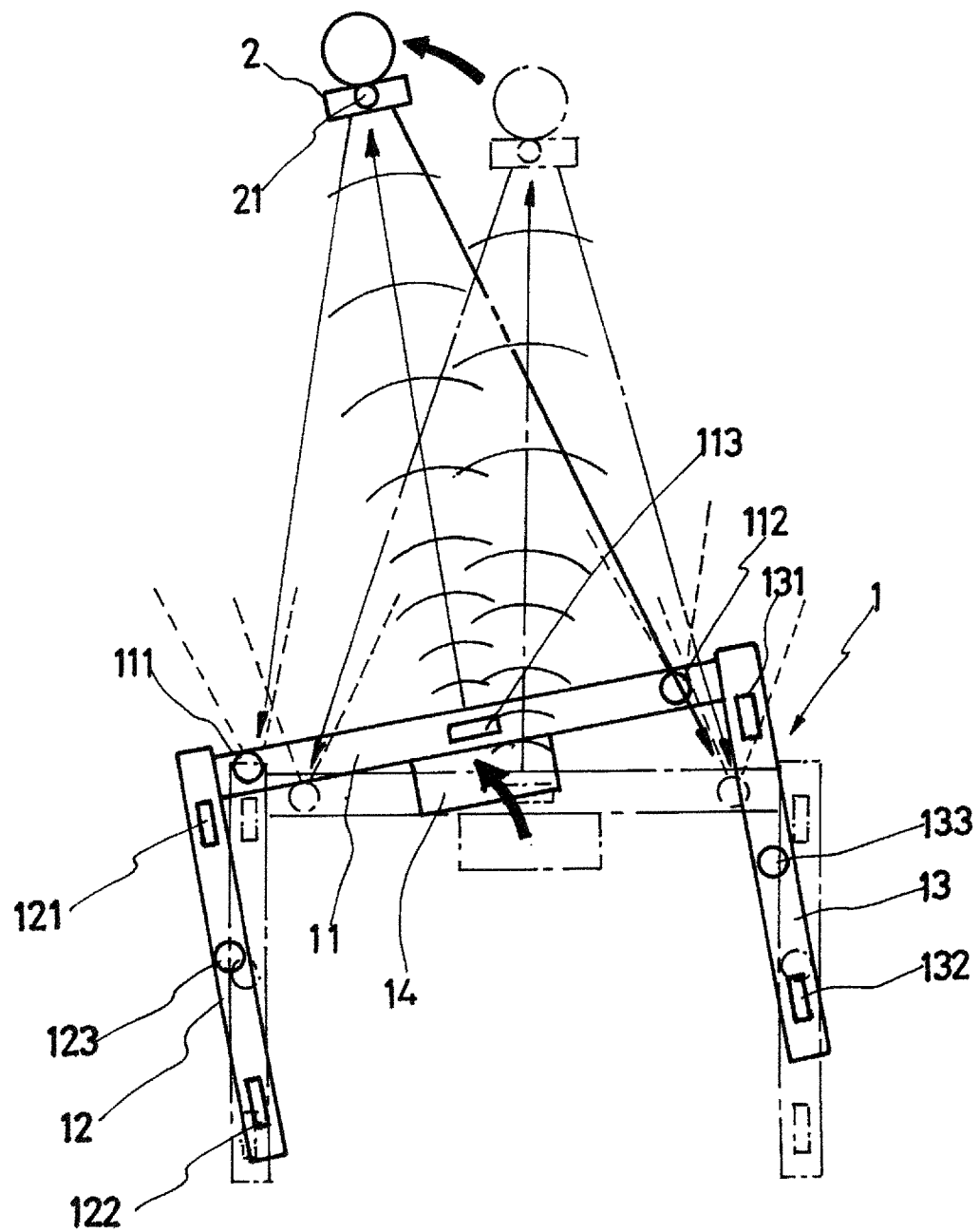
FIG. 3 is a schematic diagram showing a moving carrier of the forward and lateral tracking system of FIG. 1 follows a user as the user turns left.
Figure 4:
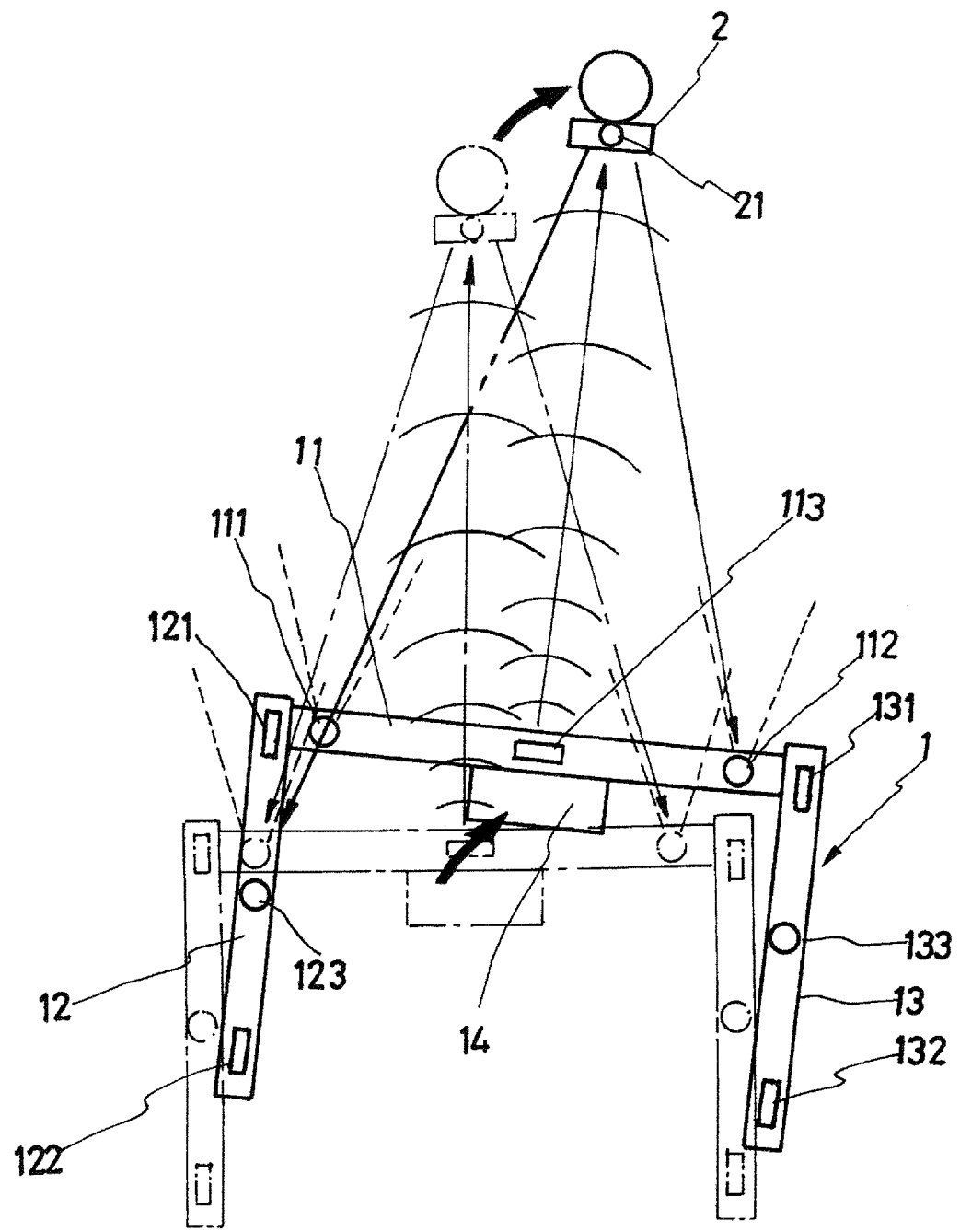
FIG. 4 is a schematic diagram showing a moving carrier of the forward and lateral tracking system of FIG. 1 follows a user as the user turns right.

In the above described forward tracking mode 103, the user carries the remote control device 2 and moves straight away from the front frame 11 (as shown in FIG. 2). The IR transmitter 21 of the remote control device 2 emits an IR signal. If the IR signal is received by both the first and second IR receivers 111 and 112, the control module 10 determines that the user is moving straight ahead of the moving carrier 1, and instructs the driving unit 14 to drive the moving carrier 1 to move straight ahead. When the user turns to the first lateral side (e.g., left side, as shown in FIG. 3), the second IR receiver 112 does not receive the IR signal from the IR transmitter 21 (the reason will be given below). The control module 10 therefore determines that the user has turned to the first lateral side, and instructs the driving unit 14 to drive the moving carrier 1 to move towards the first lateral side. Similarly, when the user turns to the second lateral side (e.g., right side as shown in FIG. 4), the first IR receiver 111 does not receive the IR signal from the IR transmitter 21 (the reason will be given below). The control module 10 therefore determines that the user has turned to the second lateral side, and instructs the driving unit 14 to drive the moving carrier 1 to move towards the second lateral side. The first supersonic detector 113 detects the forward distance between the moving carrier 1 and the user so that the control module 10 is able to maintain a constant distance between the user and the moving carrier 1. The first supersonic detector 113 can also detect whether there is an obstacle or barrier in front of the moving carrier 1.

Figure 5:
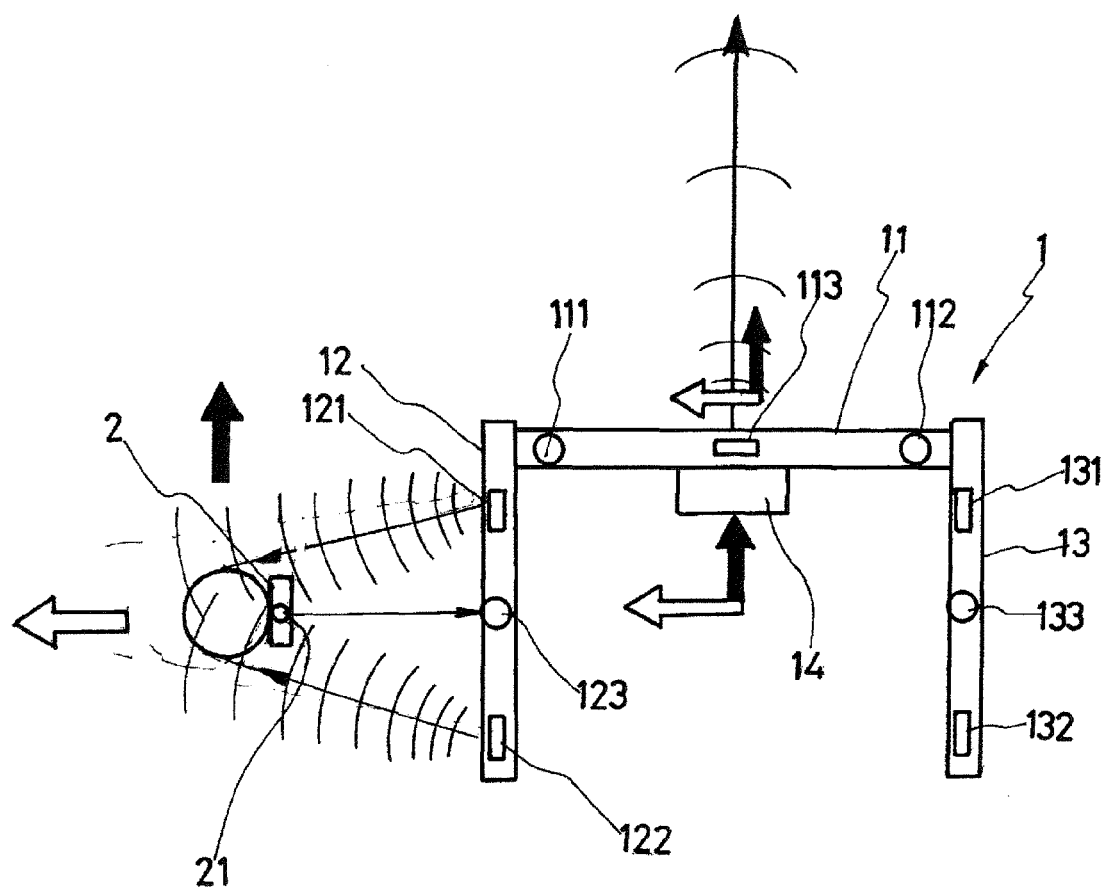
FIG. 5 is a schematic diagram showing a moving carrier of the forward and lateral tracking system of FIG. 1 follows a user as the user moves straight towards a first lateral side.
Figure 6:
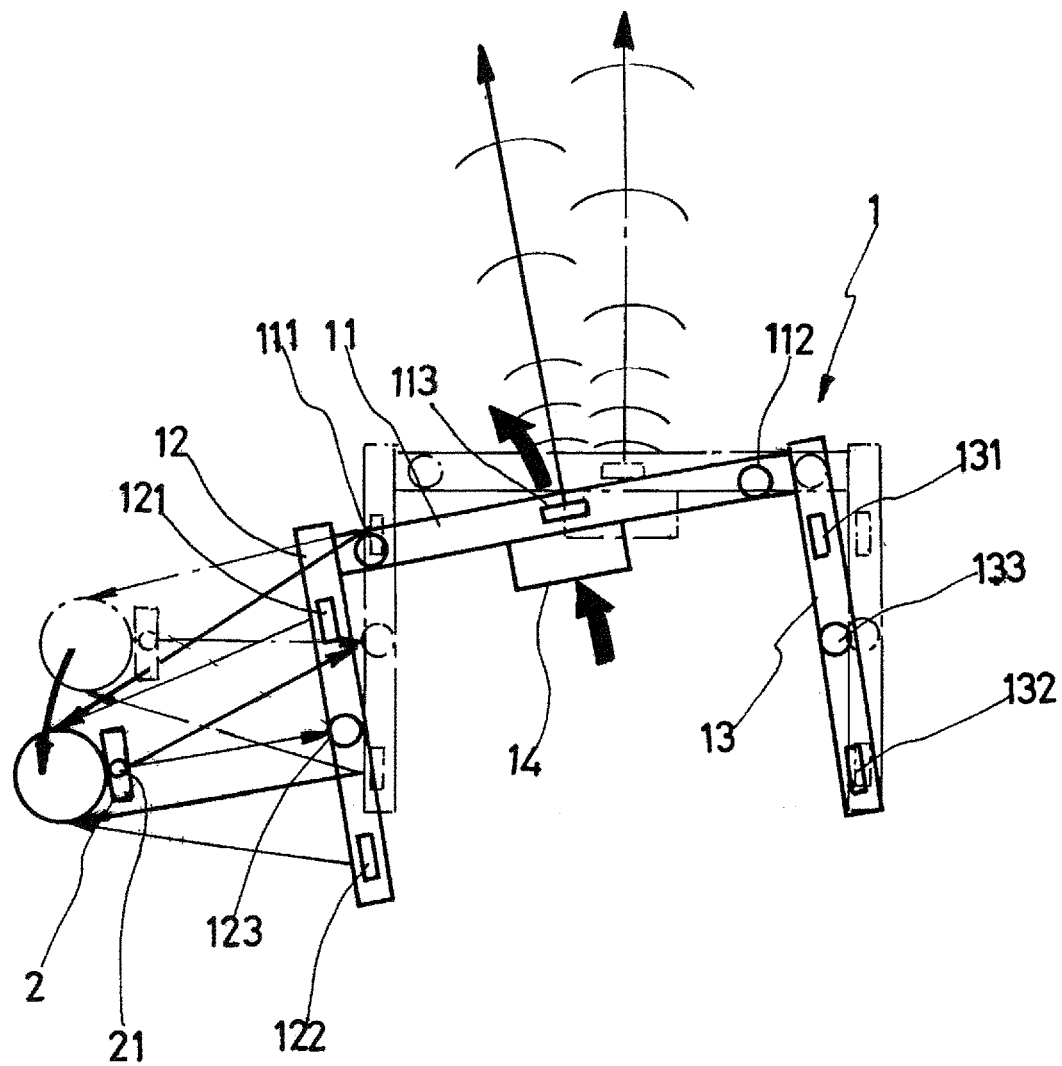
FIG. 6 is a schematic diagram showing a moving carrier of the forward and lateral tracking system of FIG. 1 follows a user moves towards a first lateral side and turns left.
Figure 7:
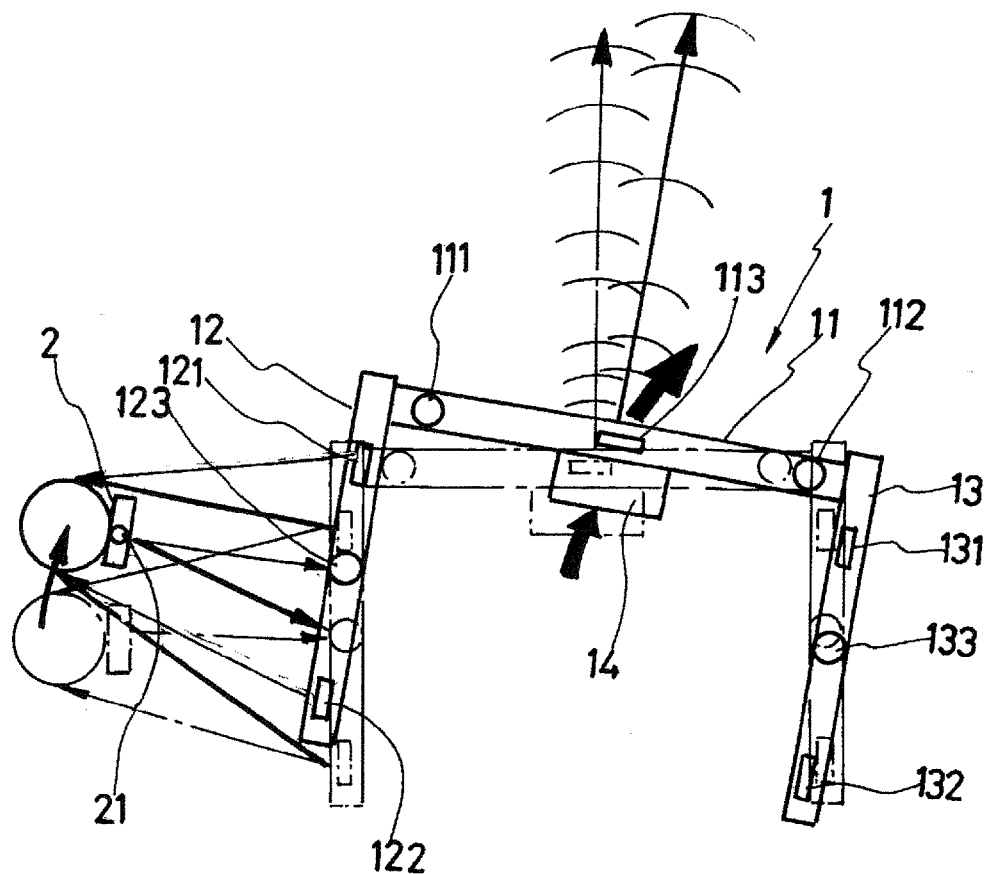
FIG. 7 is a schematic diagram showing a moving carrier of the forward and lateral tracking system of FIG. 1 follows a user moves towards a first lateral side and turns right.
Figure 8:
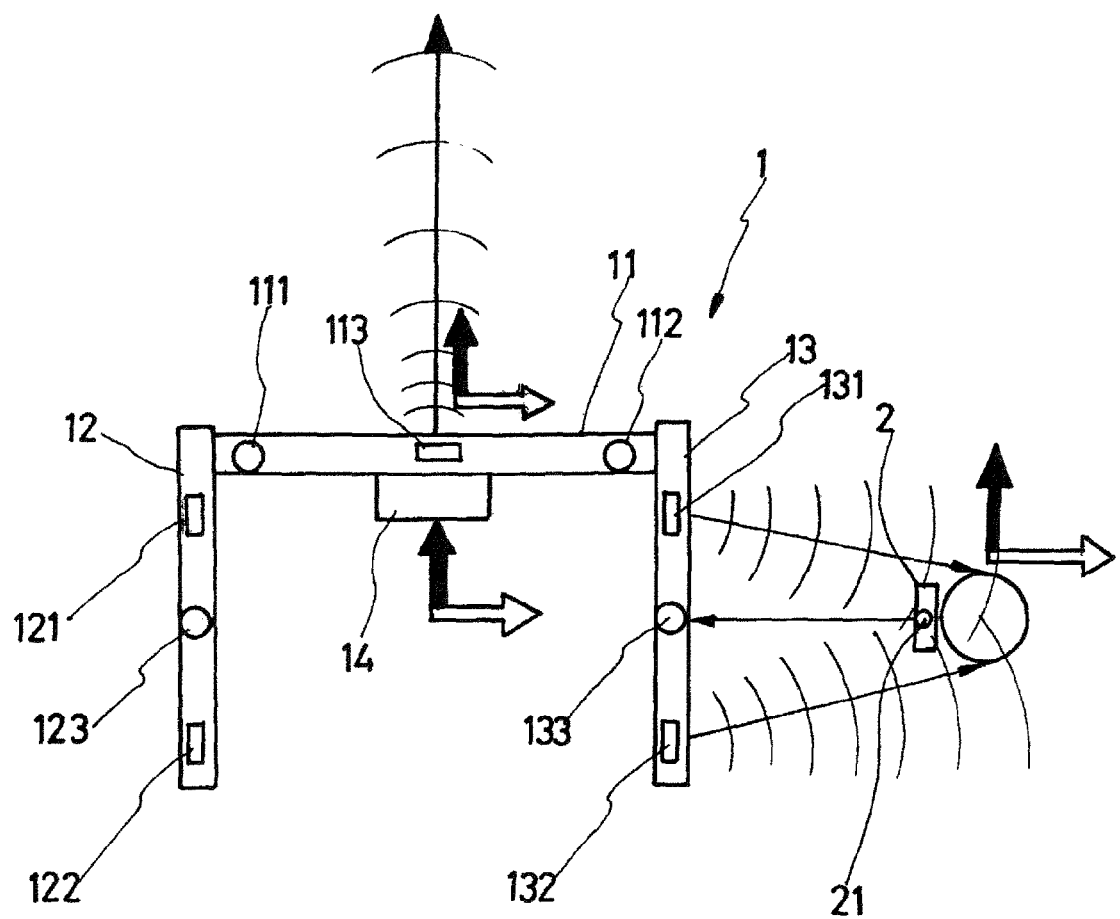
FIG. 8 is a schematic diagram showing a moving carrier of the forward and lateral tracking system of FIG. 1 follows a user as the user moves straight towards a second lateral side.
Figure 9:
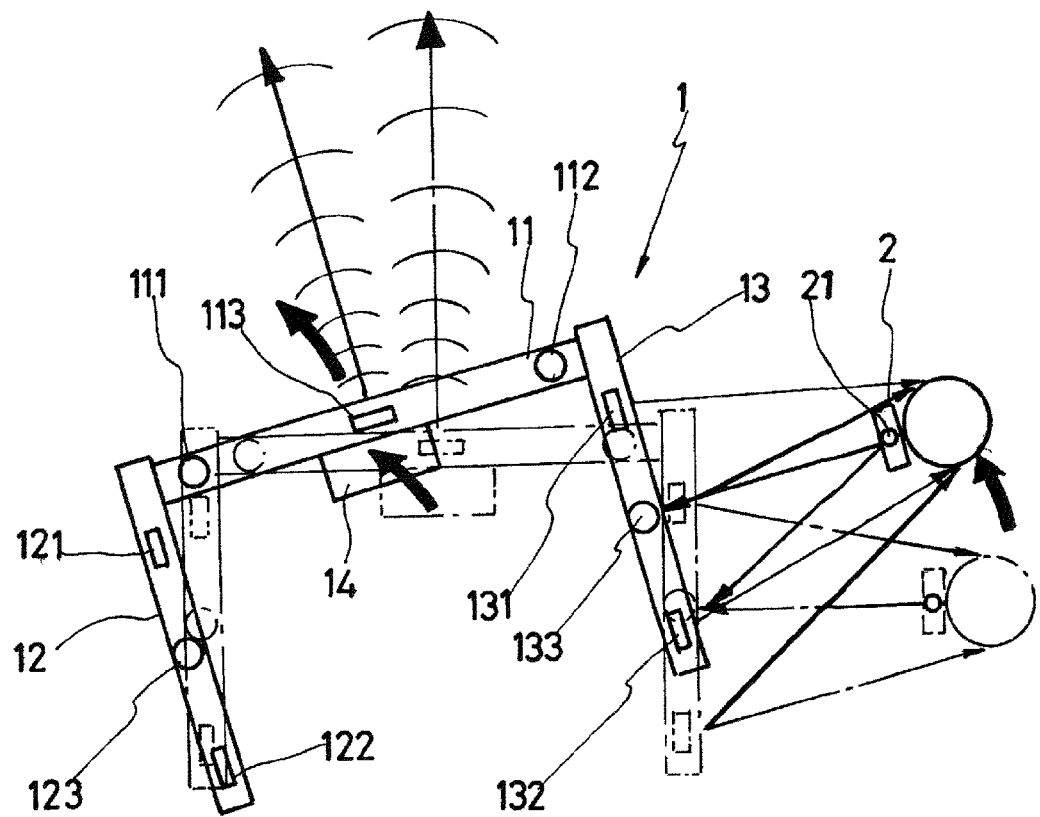
FIG. 9 is a schematic diagram showing a moving carrier of the forward and lateral tracking system of FIG. 1 follows a user moves towards a second lateral side and turns left.
Figure 10:
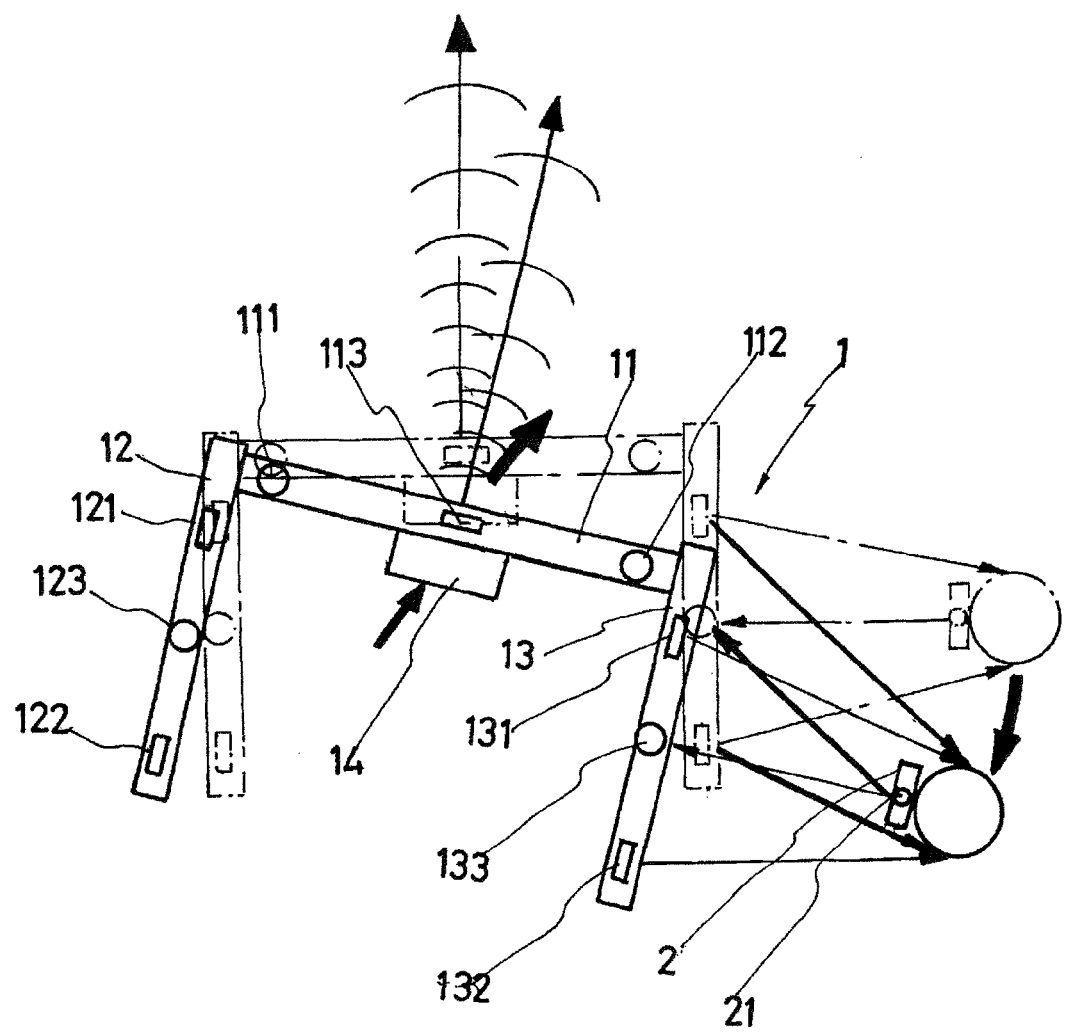
FIG. 10 is a schematic diagram showing a moving carrier of the forward and lateral tracking system of FIG. 1 follows a user moves towards a second lateral side and turns right.

In the above described first lateral tracking mode 104, the user carries the remote control device 2 and is at the first lateral side of the moving carrier 1, moving straight away from the first lateral frame 12 (as shown in FIG. 5). The second and third supersonic detectors 121 and 122 detect the moving direction of the user using triangulation method. When the second and third supersonic detectors 121 and 122 obtain identical feedback signals, the control module 10 determines that the user is moving straight towards the first lateral side, and instructs the driving unit 14 to drive the moving carrier 1 to move towards the first lateral side. When the user turns to his/her first lateral side (e.g., left side, as shown in FIG. 6), the second supersonic detector 121 receives a smaller feedback signal than that received by the third supersonic detector 122, the control module 10 determines that the user is moving towards his/her first lateral side, and instructs the driving unit 14 to drive the moving carrier 1 to turn towards the first lateral side and follow the user. When the user turns to his/her second lateral side (e.g., right side, as shown in FIG. 6), the second supersonic detector 121 receives a greater feedback signal than that received by the third supersonic detector 122, the control module 10 determines that the user is moving towards his/her second lateral side, and instructs the driving unit 14 to drive the moving carrier 1 to turn towards the second lateral side and follow the user. The third IR receiver 123 on the first lateral frame 12 receives and locks on the IR signals from the IR transmitter 21 of the user's remote control device 2 so as to measure and maintain the distance between the moving carrier 1 and the user. The first supersonic detector 113 on the front frame 11 is activated and detects whether there is an obstacle or barrier in front of the moving carrier 1. If not, the moving carrier 1 continues to move. Otherwise, the moving carrier 1 stops moving automatically or by braking.

In the above described second lateral tracking mode 105, the user carries the remote control device 2 and is at the first lateral side of the moving carrier 1, moving straight away from the first lateral frame 12 (as shown in FIG. 5). The second and third supersonic detectors 121 and 122 detect the moving direction of the user using triangulation method. When the second and third supersonic detectors 121 and 122 obtain identical feedback signals, the control module 10 determines that the user is moving straight towards the first lateral side, and instructs the driving unit 14 to drive the moving carrier 1 to move towards the first lateral side. When the user turns to his/her first lateral side (e.g., left side, as shown in FIG. 6), the second supersonic detector 121 receives a smaller feedback signal than that received by the third supersonic detector 122, the control module 10 determines that the user is moving towards his/her first lateral side, and instructs the driving unit 14 to drive the moving carrier 1 to turn towards the first lateral side and follow the user. When the user turns to his/her second lateral side (e.g., right side, as shown in FIG. 6), the second supersonic detector 121 receives a greater feedback signal than that received by the third supersonic detector 122, the control module 10 determines that the user is moving towards his/her second lateral side, and instructs the driving unit 14 to drive the moving carrier 1 to turn towards the second lateral side and follow the user. The third IR receiver 123 on the first lateral frame 12 receives and locks on the IR signals from the IR transmitter 21 of the user's remote control device 2 so as to measure and maintain the distance between the moving carrier 1 and the user. The first supersonic detector 113 on the front frame 11 is activated and detects whether there is an obstacle or barrier in front of the moving carrier 1. If not, the moving carrier 1 continues to move. Otherwise, the moving carrier 1 stops moving automatically or by braking.

When the moving carrier 1 is in the forward tracking mode 103, first lateral tracking mode 104, second lateral tracking mode 105, or manual mode 102, the first supersonic detector 113 is always activated for detecting whether there is an obstacle or barrier in front of the moving carrier 1. When the moving carrier 1 is moving and if the feedback signal from the first supersonic detector 113 is blocked or interrupted, the moving carrier 1 stops moving automatically or by braking.

The first and second IR receivers 111 and 112 can be configured inside a tubular body of the front frame 11. Corresponding to the positions of the first and second IR receivers 111 and 112, the tubular body has openings of a pre-determined aperture. These openings limit the reception coverage (angles) of the first and second IR receivers 111 and 112, respectively, as shown by the dashed lines in FIGS. 2, 3 and 4 in front of the first and second IR receivers 111 and 112. Additionally, the tubular body also provides concealment and protection to the first and second IR receivers 111 and 112.

The third IR receiver 123 can be configured inside a tubular body of the first lateral frame 12. Corresponding to the position of the third IR receiver 123, the tubular body has an opening of a pre-determined aperture. The opening limits the reception coverage (angle) of the third IR receiver 123. Additionally, the tubular body also provides concealment and protection to the third IR receiver 123.

The fourth IR receiver 133 can be configured inside a tubular body of the second lateral frame 13. Corresponding to the position of the fourth IR receiver 133, the tubular body has an opening of a pre-determined aperture. The opening limits the reception coverage (angle) of the fourth IR receiver 133. Additionally, the tubular body also provides concealment and protection to the fourth IR receiver 133.

Figure 11:
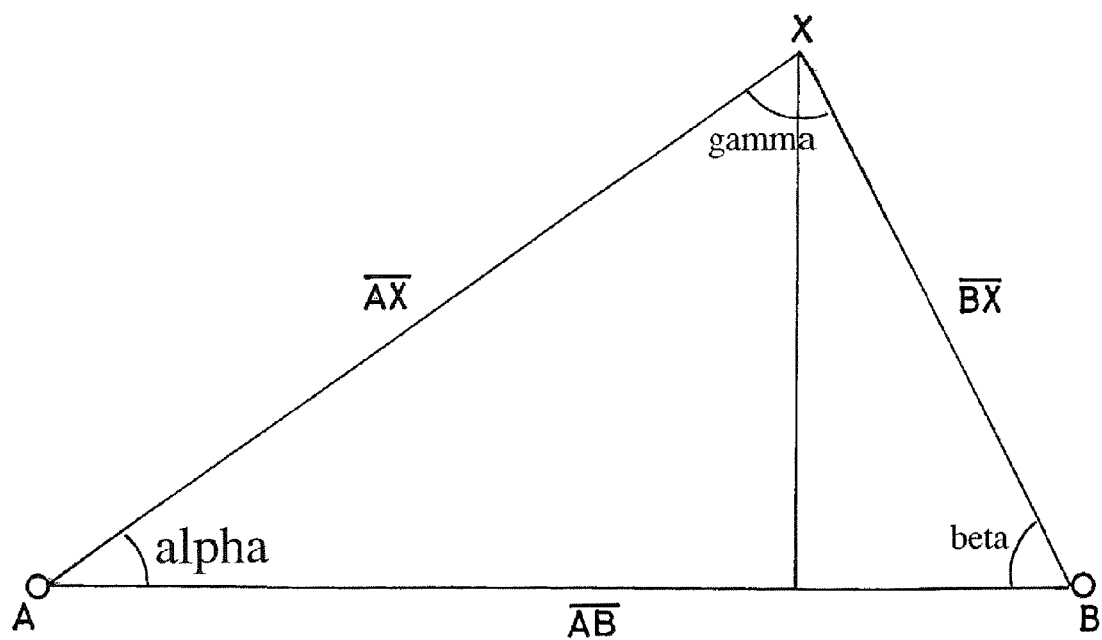
FIG. 11 is a schematic diagram showing a triangulation method employed by the present invention.

The above-mentioned triangulation method employed in the first and second lateral tracking modes 104 and 105 can be described using FIG. 11. As illustrated, X represents the user. A and B represent the second and third supersonic detectors 121 and 122, or the fourth and fifth supersonic detectors 131 and 132, respectively. AX is the distance between the user and the third or the fourth supersonic detector 122 or 131. BX is the distance between the user and the second or the fifth supersonic detector 121 or 132. AB is the distance between the second and the third supersonic detectors 121 and 122, or between the fourth and the fifth supersonic detectors 131 and 132. The distance y between the first or the second lateral frame 12 or 13 (i.e., the line between A and B) and the user can be calculated using the following equations, where x is distance between A and the projection of X on the line between A and B.

$$\frac{y}{\sin(\text{alpha})} = \frac{\overline{AX}}{\sin(90°)}$$

$$y = \frac{\overline{AX}}{\sin(90°)} * \sin(\text{alpha}) = \overline{AX} * \sin(\text{alpha})$$

$$x^{\wedge}2 = \overline{AX}^{\wedge}2 - y^{\wedge}2$$

$$x = sqrt(\overline{AX}^{\wedge}2 - y^{\wedge}2)$$

When the distance AX or BX (i.e., the feedback signal values) changes, the control module 10, by comparing the feedback signals, can determine whether the user turns to his/her left or right side.

As described above, when a user is in front of the moving carrier 1, the first and second IR receivers 111 and 112, and the first supersonic detector 113 provide lateral movement and forward distance detection, so that the moving carrier 1 automatically follows the user at a constant distance behind as the user moves straight ahead, or turns left or right. When the user is at the moving carrier 1's first lateral (e.g., left) side, the second and third supersonic detectors 121 and 122, and the third IR receiver 123 on the first lateral frame 12 provide lateral movement and distance detection, so that the moving carrier 1 automatically follows the user at a constant distance behind as the user moves straight, or turns left or right, away from the first lateral frame 12. When the user is at the moving carrier 1's second lateral (e.g., right) side, the fourth and fifth supersonic detectors 131 and 132, and the fourth IR receiver 133 on the second lateral frame 13 provide lateral movement and distance detection, so that the moving carrier 1 automatically follows the user at a constant distance behind as the user moves straight, or turns left or right, away from the second lateral frame 12.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A forward and lateral tracking system, comprising a moving carrier and a remote control device, wherein
    the moving carrier comprises a control device, a front frame, a first lateral frame, a second lateral frame, and at least a driving device;
    the control device is configured inside the moving carrier;
    the front frame is configured on the moving carrier with a first IR (infra-red) receiver configured adjacent to a first lateral side, a second IR receiver configured adjacent to a second lateral side, and a first supersonic detector configured between the first and second IR receivers on the front frame;
    the first and second IR receivers, and the first supersonic detector are electrically connected with the control device;
    the first lateral frame is configured on the moving carrier having a front end joined to a first lateral end of the front frame with a second supersonic detector configured adjacent to the front end of the first lateral frame, a third supersonic detector configured adjacent to a back end of the first lateral frame, and a third IR receiver configured between the second and third supersonic detector;
    the second and third supersonic detectors, and the third IR receiver are electrically connected with the control device;
    the second lateral frame is configured on the moving carrier having a front end joined to a second lateral end of the front frame with a fourth supersonic detector configured adjacent to the front end of the second lateral frame, a fifth supersonic detector configured adjacent to a back end of the second lateral frame, and a fourth IR receiver configured between the fourth and fifth supersonic detector;
    the fourth and fifth supersonic detectors, and the fourth IR receiver are electrically connected with the control device;
    the driving unit is configured in the moving carrier and electrically connected with the control device;
    the control device directs the driving unit to move forward, to turn to the first lateral side, or to turn to the second lateral side; and the remote control device comprises at least an IR transmitter signally linked with the first, second, third, and fourth IR receivers.

2. The forward and lateral tracking system according to claim 1, wherein the control device operates in one of an automatic mode and a manual mode.

3. The forward and lateral tracking system according to claim 2, wherein the automatic mode is further configured to be a forward tracking mode, a first lateral tracking mode, a second lateral tracking mode, or an ON/STOP mode to toggle between an ON or STOP state of the moving carrier.

4. The forward and lateral tracking system according to claim 1, wherein the remote control device further comprises at least a forward tracking button, a first lateral tracking button, a second lateral tracking button, a toggle button, and a plurality of direction control buttons; the remote control device and the control device are configured with an identification code; and, after an authentication process based on the identification code between the remote control device and the control device is successfully finished, the IR transmitter of the remote control device is signally linked to the first, second, third, and fourth IR receivers.

5. The forward and lateral tracking system according to claim 1, wherein the moving carrier further comprises at least a battery providing the required electricity to the driving unit and the control device.

6. A control method for a forward and lateral tracking system, comprising the steps of:
setting a control device of a moving carrier of the forward and lateral tracking system to operate in an automatic mode or in a manual mode;
when the automatic mode is set, setting the control device to operate in a forward tracking mode, a first lateral tracking mode, a second lateral tracking mode, or an ON/STOP mode to toggle between an ON or STOP state of the moving carrier; and
when the forward tracking mode is set, activating a first IR receiver, a second IR receiver, and a first supersonic detector on a front frame of the moving carrier, where, for a user straight ahead the moving carrier, the first and second IR receivers detect the user's left and right moving directions whereas the first supersonic detector detects a forward distance between the user and the moving carrier, and, as such, the control device automatically control the moving carrier to follow the user at a constant distance behind;
when the first lateral tracking mode is set, activating a second supersonic detector, a third supersonic detector, and a third IR receiver on a first lateral frame, where, the second and third supersonic detectors, based on a triangulation method, detect the user's left and right moving directions and a distance between the user and the moving carrier by the third IR receiver; and, as such, the control device is able to automatically control the moving carrier to follow the user at a constant distance behind;
when the second lateral tracking mode is set, activating a fourth supersonic detector, a fifth supersonic detector, and a fourth IR receiver on a second lateral frame, where, the fourth and fifth supersonic detectors, based on a triangulation method, detect the user's left and right moving directions and a distance between the user and the moving carrier by the fourth IR receiver; and, as such, the control device is able to automatically control the moving carrier to follow the user at a constant distance behind.

7. The control method according to claim 6, wherein, when the forward tracking mode is set, the user carries a remote control device of the forward and lateral tracking system and moves ahead of the moving carrier; an IR transmitter of the remote control device emits an IR signal; if the IR signal is received by both the first and second IR receivers, the control device determines that the user is moving straight ahead of the moving carrier, and instructs a driving unit of the moving carrier to drive the moving carrier to move straight ahead; when the user turns to a first lateral side, the second IR receiver does not receive the IR signal from the IR transmitter and the control device determines that the user has turned to the first lateral side, and instructs the driving unit to drive the moving carrier to move towards the first lateral side; when the user turns to a second lateral side, the first IR receiver does not receive the IR signal from the IR transmitter and the control device determines that the user has turned to the second lateral side, and instructs the driving unit to drive the moving carrier to move towards the second lateral side.

8. The control method according to claim 6, wherein, when the first lateral tracking mode is set, the user carries the remote control device and is at the first lateral side of the moving carrier, moving straight away from the first lateral frame; the second and third supersonic detectors detect the moving direction of the user using a triangulation method; when the second and third supersonic detectors obtain identical feedback signals, the control device determines that the user is moving straight towards the first lateral side, and instructs the driving unit to drive the moving carrier to move towards the first lateral side; when the user turns to his/her first lateral side, the second supersonic detector receives a smaller feedback signal than that received by the third supersonic detector, the control device determines that the user is moving towards his/her first lateral side, and instructs the driving unit to drive the moving carrier to turn towards the same direction and follow the user; when the user turns to his/her second lateral side, the second supersonic detector receives a greater feedback signal than that received by the third supersonic detector, the control device determines that the user is moving towards his/her second lateral side, and instructs the driving unit to drive the moving carrier to turn towards the same direction and follow the user.

9. The control method according to claim 6, wherein,
when the second lateral tracking mode is set, the user carries the remote control device and is at the second lateral side of the moving carrier, moving straight away from the second lateral frame; the fourth and fifth supersonic detectors detect the moving direction of the user using a triangulation method; when the fourth and fifth supersonic detectors obtain identical feedback signals, the control device determines that the user is moving straight towards the second lateral side, and instructs the driving unit to drive the moving carrier to move towards the second lateral side; when the user turns to his/her first lateral side, the fourth supersonic detector receives a greater feedback signal than that received by the fifth supersonic detector, the control device determines that the user is moving towards his/her first lateral side, and instructs the driving unit to drive the moving carrier to turn towards the same direction and follow the user; when the user turns to his/her second lateral side, the fourth supersonic detector receives a smaller feedback signal than that received by the fifth supersonic detector, the control device determines that the user is moving towards his/her second lateral side, and instructs the driving unit to drive the moving carrier to turn towards the same direction and follow the user.

10. The control method according to claim 6, wherein, when the forward tracking, first lateral tracking, second lateral tracking, or manual mode is set, the first supersonic detector is always activated; and the first supersonic detector detects whether there is an obstacle or barrier in front of the moving carrier.

\* \* \* \* \*